US005920327A

United States Patent [19]

Seidensticker, Jr.

[11] Patent Number: 5,920,327

[45] Date of Patent: *Jul. 6, 1999

[54] MULTIPLE RESOLUTION DATA DISPLAY

[75] Inventor: Robert B. Seidensticker, Jr., Woodinville, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/466,478

[22] Filed: Jun. 6, 1995

[51] Int. Cl.$^6$ .................... G06F 13/00

[52] U.S. Cl. .................... 345/523; 345/127; 345/153; 345/439; 345/501; 345/507

[58] Field of Search .................... 395/162–166, 395/125, 127, 128, 140, 141, 139, 501, 507, 523, 526, 153; 345/23, 24, 27, 55, 121, 87, 132, 133, 185, 189, 214, 127, 131, 501, 507, 523, 526, 437–443

[56] References Cited

U.S. PATENT DOCUMENTS

| | | | |
|---|---|---|---|
| 4,720,703 | 1/1988 | Schnarel, Jr. et al. | 345/127 |
| 4,771,279 | 9/1988 | Hannah | 345/132 |
| 4,790,028 | 12/1988 | Ramase | 345/127 |
| 4,878,183 | 10/1989 | Ewart | 395/128 |
| 5,067,019 | 11/1991 | Juday et al. | 348/580 |
| 5,185,667 | 2/1993 | Zimmerman | 382/293 |
| 5,185,817 | 2/1993 | Degi et al. | 345/132 |
| 5,517,612 | 5/1996 | Dwin et al. | 395/501 |
| 5,532,716 | 7/1996 | Sano | 345/132 |
| 5,670,984 | 9/1997 | Robertson et al. | 345/127 |

FOREIGN PATENT DOCUMENTS

| | | | |
|---|---|---|---|
| 2139846 | 11/1984 | United Kingdom | H04N 1/02 |

OTHER PUBLICATIONS

Furnas, "Generalized Fisheye Views," CHI '86 Proceedings, pp. 16–23.

CHI '92 Conference Proceedings, ACM conference on human factors in computing systems, "Graphical fisheye views of graphs", Monojit Sarkar et al, May 3–7, 1992, pp. 83–91.

Newman et al., *Principles of Interactive Computer Graphics*, Second Edition, McGraw Hill, New York, 1979, pp. 22–28.

De Roo et al., "A Universal Graphics Algorithm and Its Realization," *Proceedings of the SID*, vol. 22/3, 1981, pp. 139–144.

Higgins, "Fast Line–Drawing Technique," *BYTE Publications Inc.*, Aug. 1981, pp. 414–416.

(List continued on next page.)

*Primary Examiner*—Kee M. Tung
*Attorney, Agent, or Firm*—Klarquist Sparkman Campbell Leigh & Whinston, LLP

[57] ABSTRACT

A relatively large set of image data (e.g. 640×480) is mapped onto a relative smaller physical display device (e.g. 320×240) by one of a variety of techniques, usually characterized by display of a subset of the data at full resolution (i.e. 1:1). In some embodiments, the entire physical display is dedicated to display of the subset of data at 1:1 resolution; data beyond this subset is not displayed. In other embodiments, only a portion of the physical display is dedicated to 1:1 resolution, with the remainder of the physical display being used to represent some fraction of the remaining data at a lower resolution. In one embodiment, the resolution decreases with distance from the 1:1 resolution area, resulting in a fisheye lens-like geometrical distortion. A variety of other alternatives are possible. Data displayed in these lower resolution portions of the display device are geometrically compressed or distorted, but provide useful context information for the user. Desirably, user-responsive control means are provided by which the user can move the 1:1 resolution window to show different portions of the data set.

22 Claims, 9 Drawing Sheets

OTHER PUBLICATIONS

Bressenham, "Algorithm for computer control of a digital plotter," *IBM Systems Journal*, vol. 4, No. 1, 1965, pp. 25–30.

Beetem, "Vector Graphics for Raster Displays," *BYTE Publications Inc.*, Oct. 1980, pp. 286–293.

Michalski, "A Simple Vector Generation Algorithm," *Dr. Dobb's Journal*, No. 74, Dec. 1982, pp. 58–59.

Foley et al., *Computer Graphics: Principles and Practice*, Second Edition, 1987, pp. 72–91.

Ninke et al., "Shift Register Binary Rate Multipliers," *IEE Transactions on Computers*, Mar. 1977, pp. 276–278.

MULTIPLE RESOLUTION DATA DISPLAY

FIELD OF INVENTION

The present invention relates to data displays, and more particularly relates to a method and apparatus for mapping a large set of display data onto a smaller display device for viewing.

BACKGROUND AND SUMMARY OF THE INVENTION

Small handheld electronic devices, such as palmtop computers, handheld notepads, and handheld organizers, are well known and are increasing in popularity. An example is the Newton manufactured by the Apple Computer Corporation. To provide visually perceptible output to a user, such devices typically employ liquid crystal displays (LCDs). In selecting the size of an LCD for such devices, a balance must be struck between performance and cost.

If an LCD with a capability to display a large number of pixels (e.g. 640×480) is used, the display resolution is high and the displayed information is easily readable. However, such devices are expensive, and the associated computer is necessarily fairly bulky. Conversely, an LCD capable of displaying fewer pixels (e.g. 320×240) costs less and is smaller, but provides poorer display resolution.

In handheld and portable devices common in the prior art, a one-to-one mapping of memory to LCD is typically used. That is, each pixel in memory corresponds to a pixel on the LCD. This practice ties the size of the LCD to the size of the internal memory. If a smaller LCD is used, then memory size of the device is decreased accordingly, thereby limiting the data storage required.

In accordance with a preferred embodiment of the present invention, the foregoing and additional drawbacks of the prior art are overcome. A relatively large set of input image data (e.g. 640×480) is mapped onto a relative smaller physical display device (e.g. 320×240) by one of a variety of techniques, each typically characterized by display of a subset of the input data at full resolution (i.e. 1:1). In some embodiments, the entire physical display is dedicated to display of the subset of input data at 1:1 resolution; data beyond this subset is not displayed. In other embodiments, only a portion of the physical display is dedicated to 1:1 resolution, with the remainder of the physical display being used to represent some fraction of the input data outside the 1:1 subset. In one such embodiment, input data around the subset displayed at 1:1 resolution is displayed at another fixed resolution, such as 2:1 (i.e. displaying every other row/column of data). In another such embodiment, the display resolution outside the 1:1 portion gradually fades into 2:1 resolution, 3:1, 4:1, etc. A variety of other alternatives are possible.

Data displayed in these lower resolution portions of the display device is geometrically distorted and/or compressed, but provides useful context information for the user. Desirably, user-responsive control means are provided by which the user can move the 1:1 resolution portion of the window to display different portions of the input data image.

The foregoing and other features and advantages of the preferred embodiment of the present invention will be more readily apparent from the following detailed description, which proceeds with reference to the accompanying drawings.

DETAILED DESCRIPTION OF A PREFERRED EMBODIMENT

Figure 1:
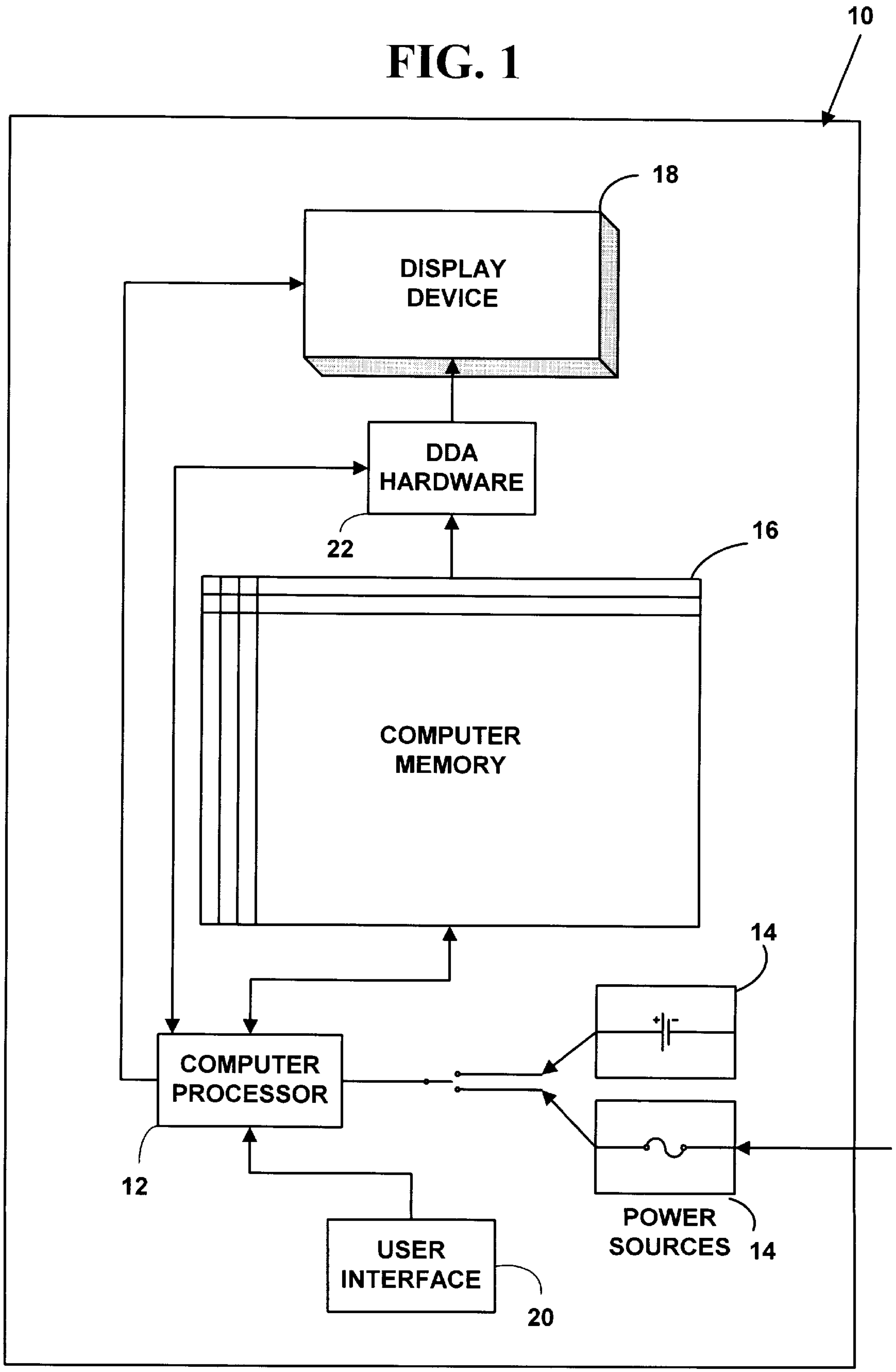
FIG. 1 is a block diagram of small handheld data processing device with a small display.

FIG. 1 shows a block diagram of a data processing device 10 with a small display. The data processing device 10 includes a computer processor 12, a power source 14, memory for storing display data 16, a small display device 18, a user interface 20, and DDA hardware 22. Desirably, the device 10 is sized for carrying in a user's pocket, as is known in the art.

The computer processor 12 can be an Apple PowerPC, an Intel 80×86, a Motorola 68000-series, or any of a variety of other well known microprocessors, including RISC, CISC and EISC varieties.

The power source 14 is a small rechargeable battery or large capacitor providing direct current operation. However, alternating current or solar energy can also be used.

The illustrated memory 16 is high speed random access memory (RAM), but any other high speed memory, including optical memory, protein memory or local secondary storage can also be used.

Particularly shown in FIG. 1 is a portion of the memory dedicated to containing display data. As is known to those skilled in the art, the memory of handheld computers (and other computers) is also used to contain portions of the computer's operating system, and currently running application programs. For clarity of illustration, these other portions of memory 16 are not shown.

The illustrated display device 18 is a passive matrix supertwisted nematic liquid crystal display, but other LCD technologies, including twisted nematic, active matrix, and others can alternatively be employed. Likewise, non-LCD technology can be employed, such as gas plasma, cathode ray tubes (CRTs), and others.

The illustrated user interface 20 includes a touch sensitive display surface which is coupled to the computer processor and used to detect and interpret user commands. In other embodiments, the user interface can employ a trackball, mouse, pen or other known device.

The illustrated Digital Differential Analyzer (DDA) hardware 22 is an integrated circuit (e.g. custom gate array, PLA, dedicated processor, or programmable processor) used in conjunction with the display device 18, as described below. In other embodiments, the DDA can be implemented by a dedicated microprocessor, or its functionality can be realized by software instructions stored in a read-only memory (ROM) or in RAM and executed by the processor 12.

In operation, the data processing device's memory 16 stores a frame of display data in row and column format (e.g. corresponding to I rows and J columns of pixels). The display device 18 also displays a data frame in row and column format (i.e. M rows by N columns of pixels). However, the row and column resolution of the display device 18 is smaller than that of the device memory 16. That is, the product of the M rows times N columns in the data display 18 is less than the product of I rows times J columns in the memory 16 (display pixels MN<memory pixels IJ). As a result, the display device 18 is incapable of displaying a whole data frame from memory 16 at a one-to-one pixel correspondence.

The data processing device therefore must "map" a subset of the larger data frame from memory 16 onto the smaller display device 18. At the same time, the display device desirably should display at least part of the memory data subset at a one-to-one resolution (i.e. one pixel in the memory data subset is displayed with one pixel on the display device).

One embodiment of the invention, detailed at the end of this specification, results in a "fisheye" display. To aid in understanding of the other embodiments, the conceptual underpinnings of this embodiment are reviewed here.

Figure 2:
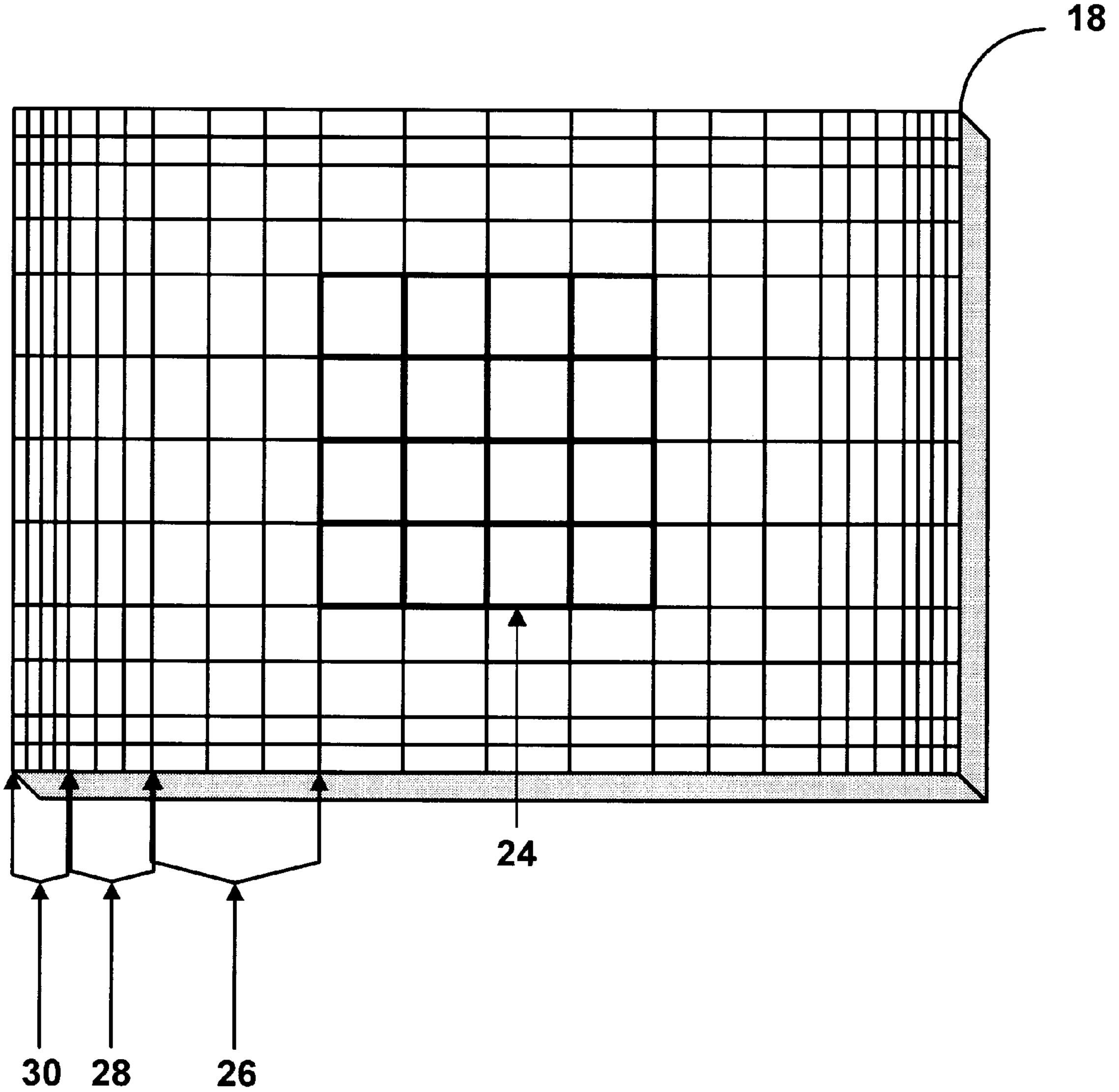
FIG. 2 shows a visual conception of a display exhibiting "fisheye" geometrical distortion.

A "fisheye" display is characterized by a region displayed at full resolution, adjoining other regions in which the resolution diminishes at successively spaced pixels. FIG. 2 is a visual conception if how the "fisheye" geometric distortion actually looks. FIG. 2 is a visual conception only; on the actual display device 18, every pixel is exactly the same size as every other pixel.

In the middle of the "fisheye" geometric display is an area 24 called the "normal display area" (NDA) which displays data from a subset of the memory 16 in a one-to-one (1:1) resolution format. Normal display area 24 is shown as a 4×4 pixel square for purposes of illustration, but can be any size or shape depending on the particular application.

The areas of the display device outside the normal display area 24 present data at successively reduced resolution, changing gradually from 1:1 to 2:1 (26), 3:1 (28), and 4:1 resolution (30). In the 2:1 resolution area, rows and columns are alternately displayed and skipped when mapping data from memory 16 to the display device 18. In the 3:1 resolution area, every third row/column is displayed, and the two intervening rows/columns are skipped. Likewise for areas of successively lower resolution.

For convenience of illustration, the transitions in display resolution are shown as discrete in the figures. In the preferred embodiment, the resolution changes smoothly from 1:1 to, e.g., 4:1. This smooth transition is effected by the DDA 22. DDA 22 works on the principle that a continuous, linear function (e.g. a transition in display resolution from 1:1 to 4:1) can be approximated by a series of discrete steps.

Figure 3A:
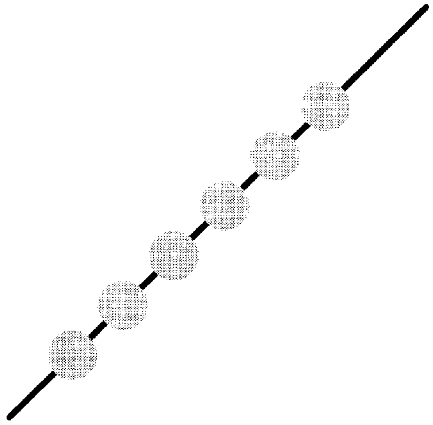
FIGS. 3A and 3B illustrate a perfect line, and an imperfect symmetrical line drawn with a symmetrical DDA technique.
Figure 3B:
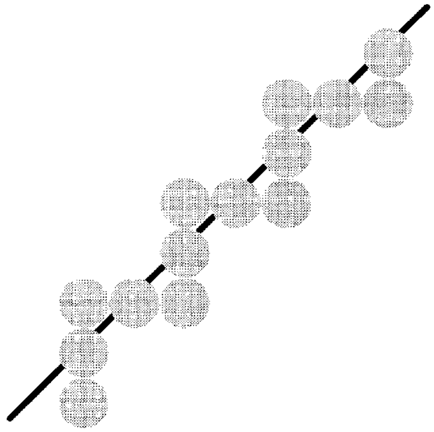

A familiar application of DDA is computer graphic representation of inclined lines. To draw an inclined line using pixels on a computer display, it would be desirable to achieve the result illustrated in FIG. 3A. However, computer display pixels are arrayed in uniform row/column arrangement, making the display of FIG. 3A virtually impossible to achieve. FIG. 3B shows an approximation achieved by application of a DDA technique.

Consider a transition in resolution from 2:1 to 3:1. Using "X" to represent a row or column of pixels that is displayed, and "O" to represent a row or column of pixels that is skipped, 2:1 resolution can be represented as:

XOXOXO

Likewise, 3:1 resolution can be represented as:

XOOXOOXOO

A dithered transition between these two resolutions might appear as follows:

XOXOXOXOOXOXOXOOXOXOOXOXOXOOXOO

There are several well known forms of DDA including simple, symmetrical, Bresenham's method, Van Aken's method, etc. In the preferred embodiment, a symmetrical DDA technique is used. As will be appreciated by those skilled in the art, the symmetrical DDA technique is well suited for digital implementation since it can be implemented to rely heavily on powers of two for multiplicands and divisors, allowing these operations to be effected by simple bit shifting procedures.

For purposes of illustration in FIGS. 4–9, a 16×16 memory 16 is used along with an 8×8 pixel display device 18. Each memory location in the 16×16 memory matrix represents a pixel that can be displayed on the display device 18. The actual memory 18 would more likely contain hundreds of thousands of pixels (e.g. 307,200 for a VGA display).

Also for purposes of illustration, each of the pixels in FIGS. 4–9 is uniquely numbered (1–256) so that like pixels in different modes of operation can be identified.

The present invention can be implemented to provide any number of display modes. In a preferred embodiment, the user can switch between various of these modes based on needs or preferences, by issuing commands through the user interface 20.

Figure 4:
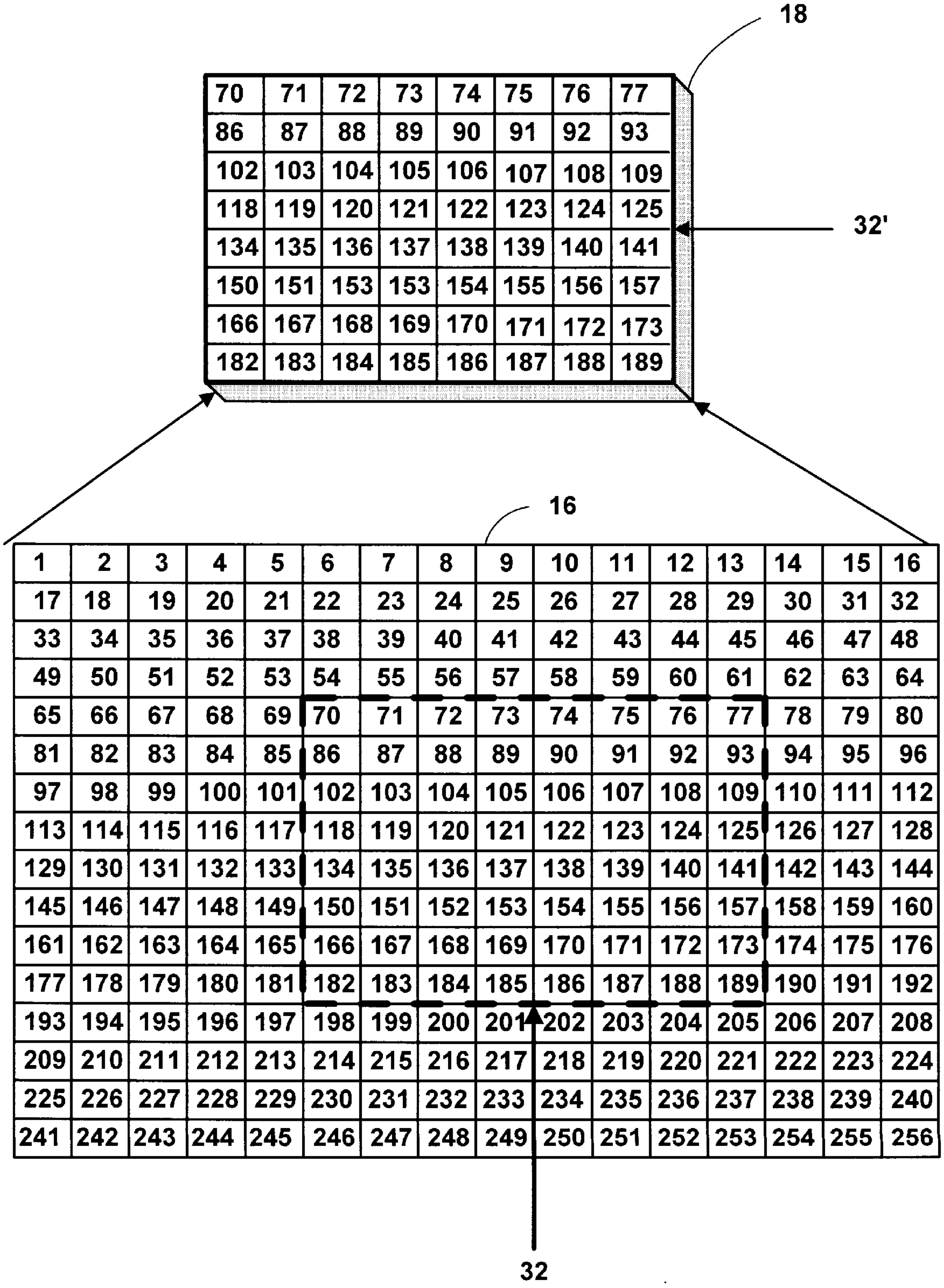
FIG. 4 is a diagram showing one form of mapping between a data subframe in memory and a display device.

One option is to have the normal display area (i.e. the region of 1:1 resolution) occupy the whole display device 18. This is shown in FIG. 4. Every pixel in a memory subframe 32 is mapped directly from memory 16 to the display device 18, presenting uniform 1:1 resolution across the display 32'. In this case, the normal display area 32' and the display 18 are coextensive.

Figure 5:
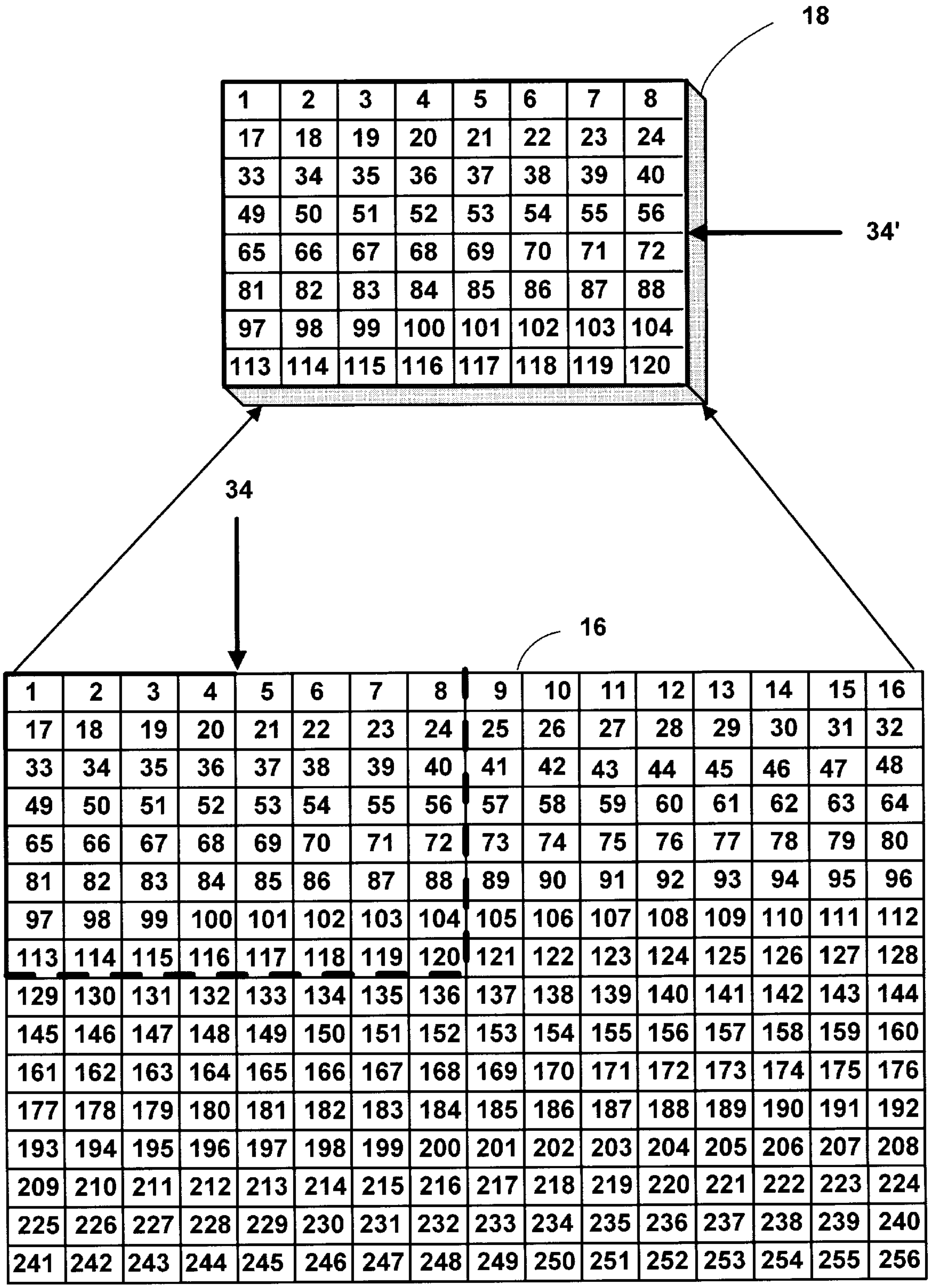
FIG. 5 is a diagram showing that the 1:1 resolution portion of the FIG. 4 display can be moved within the memory.

A user can map different subframes from memory 16 to display device 18. In FIG. 5, for example, the user has moved the subframe mapping (e.g. by the user interface 20) to display data from a subframe 34 of the memory 16. The normal display area is shown by 34'.

Figure 6:
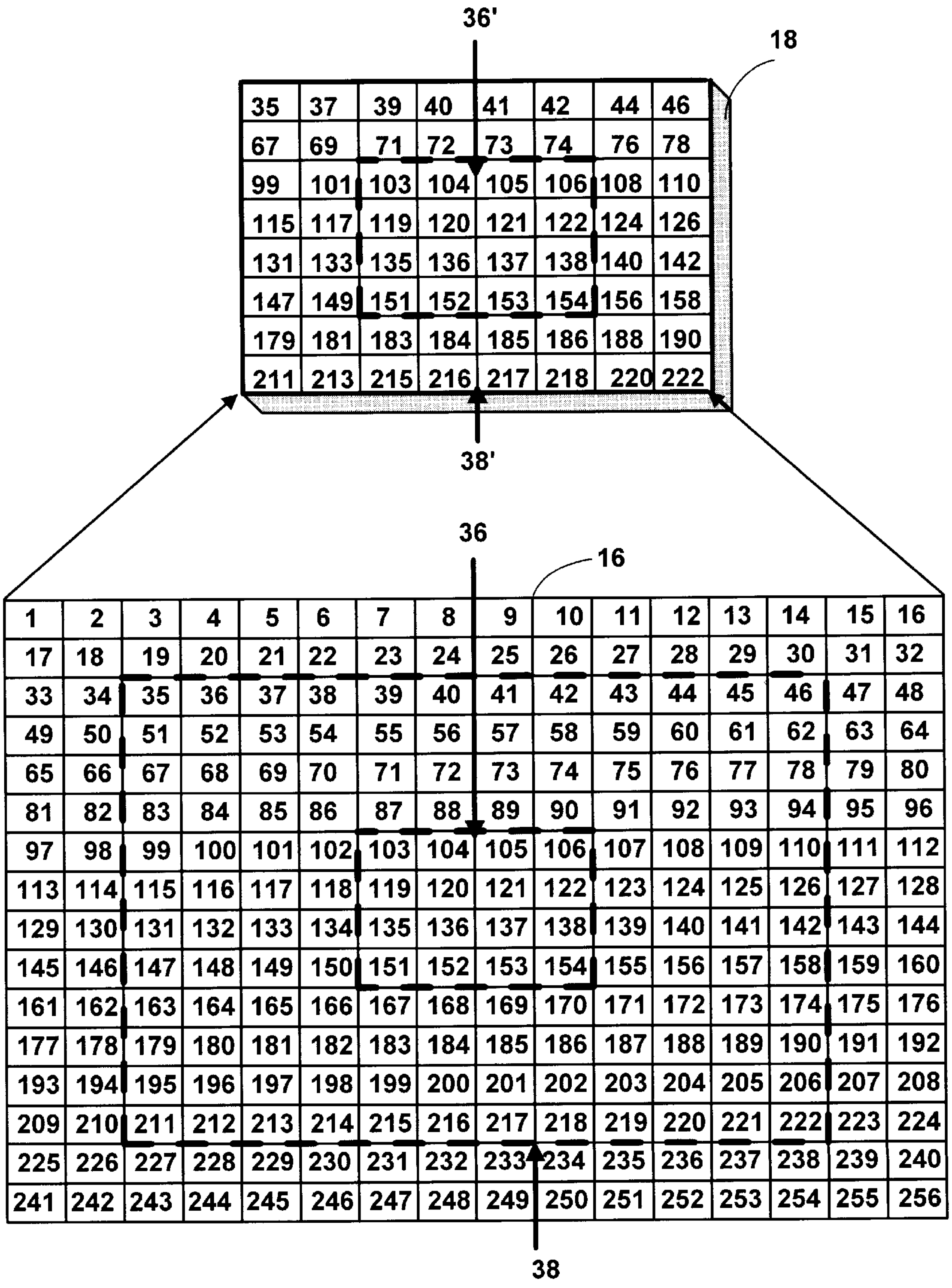
FIGS. 6–9 are diagrams showing other forms of mapping between a data subframe in memory and a display device.

A second option, shown in FIG. 6, is to present a smaller normal display area 36' (i.e. the area of 1:1 mapping), and to fill the remainder of the display 18 with data from memory 16 displayed at a lower resolution 38'. In FIG. 6, the data 38' outside the normal display area 36' is displayed with a fixed 2:1 resolution.

The data values in memory 16 mapped to the 1:1 normal display area 36' are shown by rectangle 36. The data values mapped to the 2:1 resolution area 38' are shown by rectangle 38.

Within the normal display area 36', all of the pixels in region 36 of the memory 16 are displayed. To the right and left of the normal display area 36', every other column is skipped until the edge of the display is reached. To the top and bottom of the normal display area, every other row is skipped until the edge of the display is reached.

(Here an issue of semantics is raised. Referring to the depiction of the display 18 in FIG. 6, the corners reflect both skipped rows and columns of pixels. Thus, for every square 4-pixel region in the memory 16 (e.g. 35, 36, 51, 52), only one pixel is displayed on display 18. This may be considered 4:1 resolution. However, a better description may be that this portion is displayed at 2:1 resolution in both the row- and column-dimensions. Using this vernacular, the area immediately to the left and right of the normal display area 36' is displayed at 2:1 column resolution and 1:1 row resolution. Likewise, the area immediately to the top and bottom of the normal display area 36' is displayed at 2:1 row resolution and 1:1 column resolution.)

Figure 7:
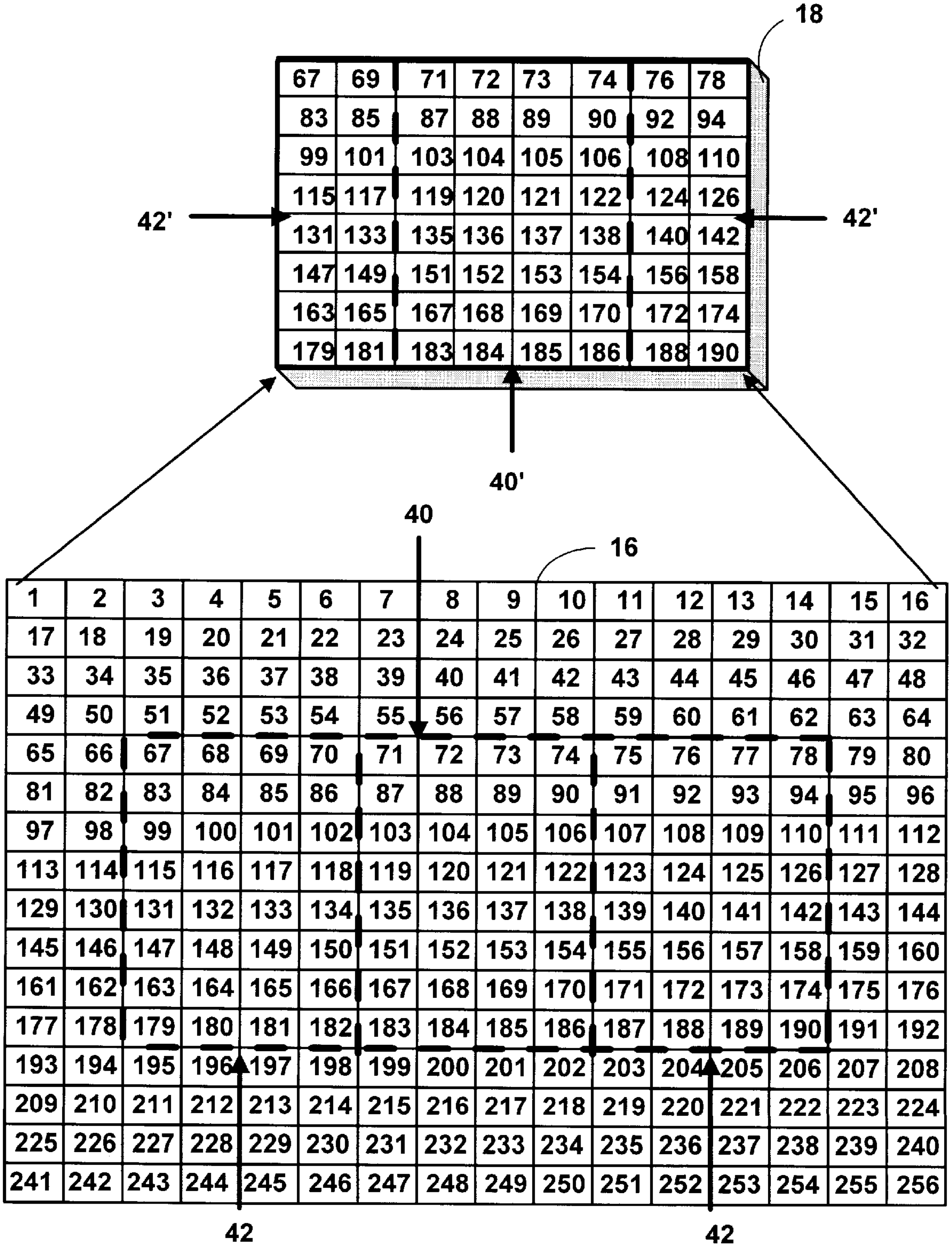

A third display option, shown in FIG. 7, is to have the normal display area 40' (corresponding to region 40 of the display memory 16) span the entire height of the display 18. This option is useful when displaying data with vertical display characteristics. On either side of the normal display area 40' are regions 42' where the data is presented at 2:1 resolution (corresponding to regions 42 of the display memory 16). In these latter regions, only every other column of data is mapped from the memory to the display 18. (Every row is presented.) The FIG. 7 embodiment can treat the resolution in areas 42' in two different manners. In one, most of the depicted areas 42' are literally displayed at exactly 2:1 column resolution, with DDA used only to effect a smooth transition in a band between these regions. In the other, the resolution in areas 42' changes smoothly throughout, starting at 1:1 at area 40', and ending at 2:1 at the edges of the display 18.

Figure 8:
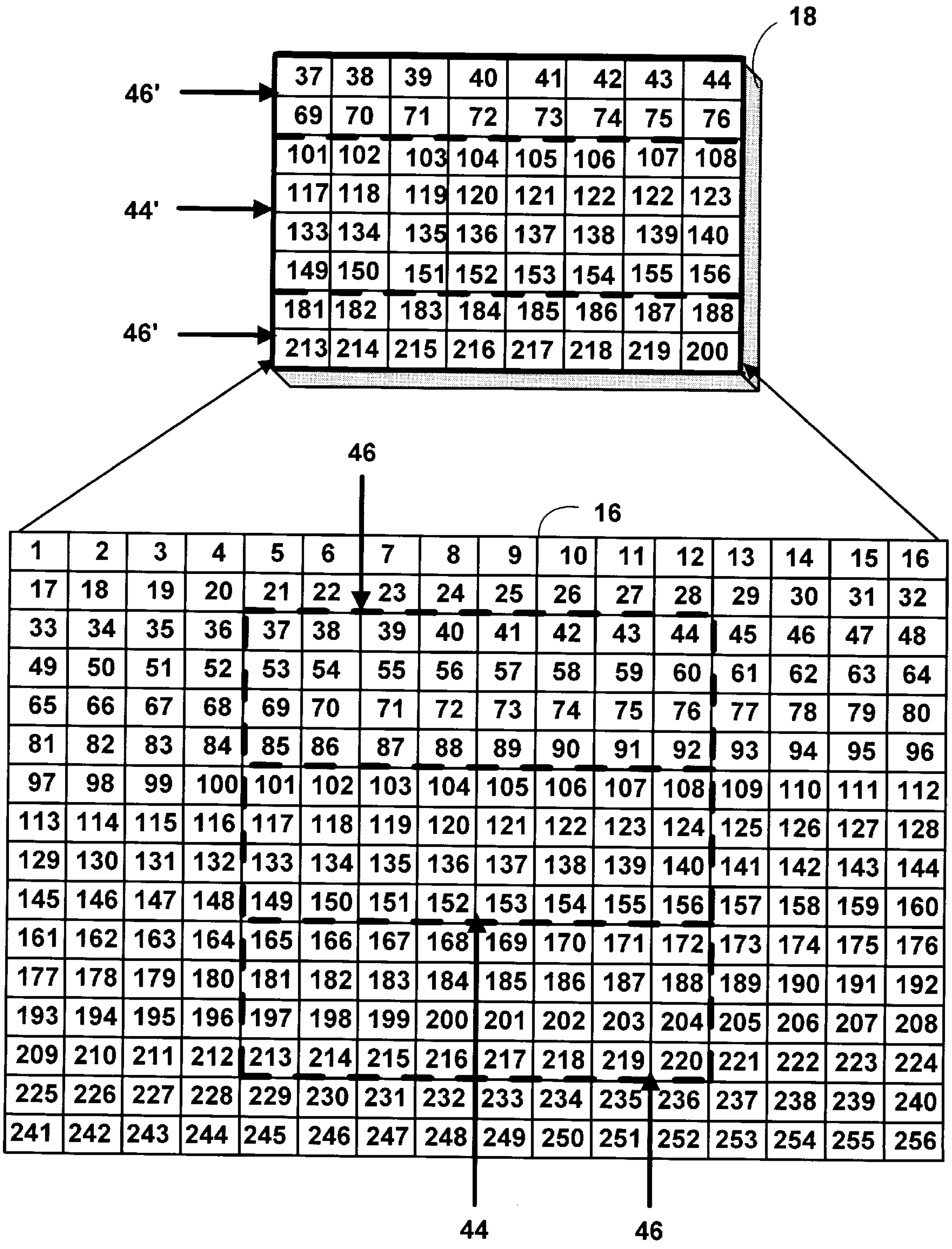

A fourth display option, shown in FIG. 8, is to have the normal display area 44' (corresponding to region 44 of the display memory 16) span the entire width of the display 18. This option is useful when displaying data with horizontal display characteristics, such as text. Above and below the normal display area 44' are regions 46' where the data is presented at 2:1 resolution (corresponding to regions 46 of the display memory 16). In these latter regions, only every other row of data is mapped from the memory to the display 18. (Every column is presented.)

Figure 9:
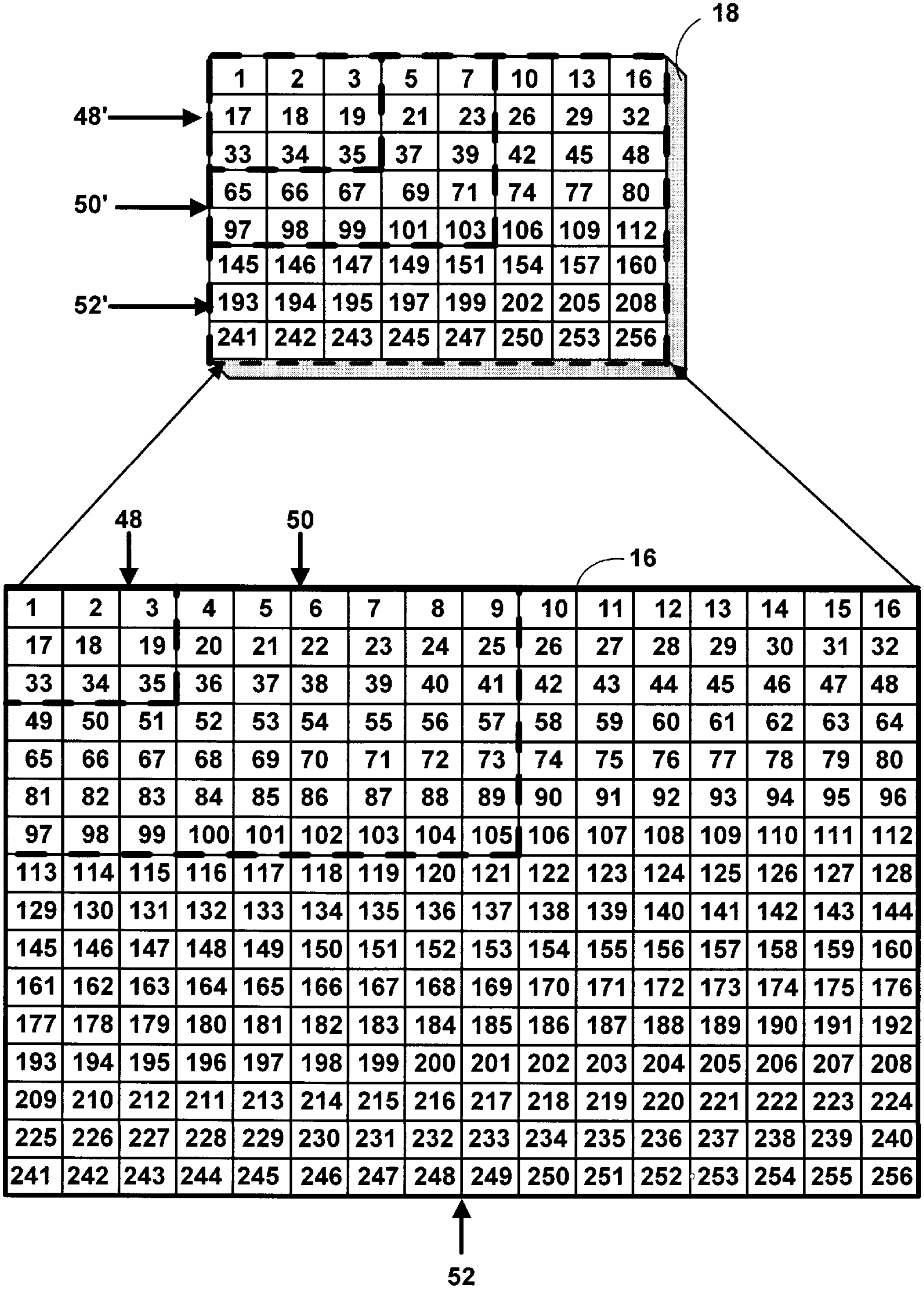

A fifth display option, shown in FIG. 9, is to provide a small normal display area 48' and to geometrically fade from 1:1 resolution into progressively lower resolutions (e.g. 2:1 in area 50', and 3:1 in area 52') towards the edges of the display device 18 (corresponding to regions 48, 50, 52 of display memory 16 respectively). This is the fisheye embodiment reviewed earlier and conceptually depicted in FIG. 2.

As noted earlier, the transition between areas of different resolution (e.g. between areas 48' and 50') is desirably not abrupt, but is effected gradually using a DDA technique. Again, due to the small data sets shown in the Figures (e.g. 8×8 and 16×16), this smooth transition is impractical to illustrate.

It will be noted that the four corner pixels stored in the full frame of memory 16 (i.e. 1, 16, 241, and 256) are each displayed on the display device. In many applications, including the embodiments illustrated in FIGS. 6–8, this is desirable, since it gives the user data spanning the entire extent of the memory frame 16. In the foregoing embodiments, the resolution(s) outside the normal display area can be chosen so that the mapping function extends to include these corner pixels.

In all of the foregoing embodiments, the normal display area can be moved around the display device 18 with the user interface 20. In the preferred embodiment, a screen stylus is displayed on the display device 18. The stylus position is determined by an x,y coordinate pair. The normal display area is centered around the stylus's x,y position. Any lower resolution areas (e.g. 2:1, 3:1, 4:1, e.g.) are centered around the normal display area.

When a user moves the stylus to a new position, a series of subroutines are called to refresh the normal display area and adjoining areas with new data centered around the stylus's new x,y position. These subroutines are part of a set of display control software included in the operating system of computer 10 and executed by CPU 12. However, these same subroutines could also be implemented in hardware (e.g. in an integrated circuit or ROM), thereby removing this chore from the CPU 12.

The user interface 20 also permits the user to change the size of the normal display area, to encompass more or less display data. One technique by which this can be accomplished is to hold down a keyboard key (e.g. the Control key), while dragging the stylus along the screen. By dragging the stylus diagonally away from the center of the normal display area, the height and width of this area are increased in fixed proportion. By dragging the stylus diagonally towards the center of the display area, the height and width of this area are reduced in fixed proportion. Dragging the stylus in a horizontal or vertical direction changes the size of the normal display area in a horizontal or vertical dimension, respectively. All of these stylus movements are interpreted and acted upon by the display control software (or hardware, if the display control is implemented in hardware) running on the computer 10. This software also enables the user to change the display mode, and the shape of the normal display area, by corresponding keyboard commands.

While the illustrated embodiments have had, for each pixel displayed on display 18, a single pixel counterpart in memory 16, this need not be the case. In different forms of the invention, a pixel in a lower resolution portion of the display 18 can reflect the average of several pixels in the memory.

Having illustrated and described the principles of the present invention in a preferred embodiment, it should be apparent to those skilled in the art that the embodiment can be modified in arrangement and detail without departing from such principles.

For example, while the invention has been illustrated with reference to a display for a small handheld device, the same principles can likewise be employed in any display application, including personal computers and televisions. The same principles can likewise be employed irrespective of the type of pixel, e.g. monochrome, grayscale, palettized color, true color, etc. Further while the invention has been illustrated with reference to an embodiment in which various of the elements are implemented in hardware and others in software, it will be recognized that many of the hardware elements can be implemented with software, and vice versa. Still more variations will likewise be apparent to the artisan.

In view of the wide variety of embodiments to which the principles of my invention can be applied, it should be understood that the illustrated embodiments are exemplary only, and should not be taken as limiting the scope of my invention. Rather, I claim as my invention all such embodiments as come within the scope and spirit of the following claims and equivalents thereto:

I claim:

1. A device comprising:

a central processing unit (CPU);

data storage coupled to the CPU, the data storage including a display memory for storing a frame of display data, the frame having I rows and J columns of pixels; and a display device coupled to the CPU, having M rows and N columns of pixels, product MN being less than the product IJ; and means for mapping a first subset of the frame of display data at a first resolution from the data storage onto a first area of the display device and for selectively mapping a second subset of the display data at a reduced resolution, less than the first resolution, from the data storage onto a second area of the display device adjacent the first, wherein said mapping means omits from the second subset selected rows and/or columns of display data according to a pattern when mapping display data to the second area of the display device, said pattern being interrupted for display of the first subset of frame data, said pattern being achieved without consideration of the subjective importance of the displayed second subset of data.

2. The device of claim 1 in which the first resolution is one-to-one, and in which the mapping means maps to the display device only rows from said first subset of display data at one-to-one correspondence.

3. The device of claim 1 in which the first resolution is one-to-one, and in which the mapping means maps to the display device only columns from said first subset of display data at one-to-one correspondence.

4. The device of claim 1 in which said mapping means omits rows and/or columns of display data from the second subset according to a fixed periodic spacing, wherein said second subset of data is displayed at a substantially fixed resolution on the display device.

5. The device of claim 1 in which said mapping means omits from the second subset successively more frequent rows and/or columns of display data at successively greater spacings from said first subset, wherein said second subset of data is displayed at a resolution that varies with distance from said first subset of data on the display device.

6. The device of claim 1 in which said mapping means omits certain rows and/or columns of display data that are outside said first subset so as to achieve a desired transition effect between regions of different resolution.

7. The device of claim 1 in which the mapping means includes means for mapping four corner pixels from the frame of display data stored in the memory to corner pixels of the display device.

8. The device of claim 1 which further includes user interface means allowing a user to change the first subset of the frame of display data that is to be displayed at said first resolution.

9. The device of claim 1 in which the first resolution is one-to-one.

10. In a computer including a CPU with intercoupled memory and display, the memory having I rows and J columns, and the display having M rows and N columns where the product of MN is less than IJ, an improved method of displaying data from said memory on said display comprising:

mapping a first set of data from the memory to a first region of the display at a first resolution;

selectively mapping a second set of data from the memory to a second region of the display at a second resolution different than the first, said selective mapping of the second set of data being performed without consideration of the subjective importance of the displayed second set of data; and mapping transition data from the memory to a region of the display between the first and second regions, said mapping being performed in conjunction with a DDA technique, said transition data avoiding an abrupt change in resolution between the first and second sets of data.

11. A computer readable medium having stored therein instructions for causing a computer to perform the method of claim 10.

12. The method of claim 10 in which the first resolution is one-to-one.

13. A computer executed method of displaying pixel data stored in a memory on a display device, the memory storing I rows by J columns of pixel data, the display presenting M rows by N columns of pixel data, where product IJ is greater than product MN, the method comprising the following steps:

mapping a first subset of data from the memory to the display device at a first resolution;

selectively mapping a second subset of data from the memory to the display device at a second resolution different than the first, said mapping of the second subset omitting selected rows and/or columns of the pixel data according to a pattern, said pattern being achieved without consideration of the subjective importance of the displayed second subset of data, said pattern being interrupted for mapping of the first subset.

14. The method of claim 13 which includes displaying four corner pixels from data stored in the memory at corner pixels of the display device.

15. A computer readable medium having stored therein instructions for causing a computer to perform the method of claim 13.

16. The method of claim 13 which includes selecting a different first subset of data for display at the first resolution, said selecting including moving an indicia displayed on said display device.

17. The method of claim 16 which includes changing the size of the first subset of data for display at the first resolution, said changing including operating a switch associated with the computer while moving the indicia on the display device.

18. The method of claim 17 in which said switch is a key on a keyboard associated with the computer.

19. The method of claim 13 in which the first resolution is one-to-one.

20. A method of displaying data on a computer comprising:

a central processing unit (CPU):

data storage coupled to the CPU, the data storage including a display memory for storing a frame of display data, the frame having I rows and J columns of pixels;

a display device coupled to the CPU, having M rows and N columns of pixels, product MN being less than product IJ;

the method including:

mapping a subset of the frame of display data to the display device, changing said subset by moving an indicia displayed on the display device to move a center of said subset within the frame of display data; and changing the extent of said subset by changing a pattern of skipped rows or columns, said changing including operating a switch associated with the computer while moving the indicia on the display device.

21. The method of claim 20 in which said switch is a key on a keyboard associated with the computer.

22. A computer including a CPU, a memory, and a display device, intercoupled together, the memory having a portion thereof allocated to storing a frame of display data, said portion storing more display data than can be displayed on the display device, the computer further includes a mapping means for mapping a contiguous subset of the frame of display data from said portion of memory to the display device at one-to-one correspondence to completely fill said display device, the computer further including a user interface allowing a user to select different subsets of the data stored in said portion for display at said one-to-one correspondence, said user interface further including means for changing the extent of the contiguous subset of data by changing a pattern of skipped rows or columns, said means including a switch and means for moving an indicia on the display device while said switch is closed.

* * * * *

UNITED STATES PATENT AND TRADEMARK OFFICE

CERTIFICATE OF CORRECTION

PATENT NO. : 5,920,327

DATED : July 6, 1999

INVENTOR(S) : Seidensticker, Jr.

It is certified that error appears in the above-indentified patent and that said Letters Patent is hereby corrected as shown below:

| Col./Line | Error Reads | Should Read |
| --- | --- | --- |
| 5/25 | paragraph missing | Again, the resolution in areas 46' can be presented in two different manners. In one, most of the depicted areas 46' are literally displayed at exactly 2:1 row resolution, with DDA used only to effect a smooth transition in a band between these regions. In the other, the resolution in areas 46' changes smoothly throughout, starting at 1:1 at area 44', and ending at 2:1 at the edges of the display 18. |
| 6/47 | thereto: | thereto. |
| 8/32 | (CPU): | (CPU); |

Signed and Sealed this

Tenth Day of April, 2001

Attest:

Nicholas P. Godici

NICHOLAS P. GODICI

*Attesting Officer*

*Acting Director of the United States Patent and Trademark Office*